Dec. 7, 1948. W. FANELLI ET AL Des. Re. 23,055

A FRONT FOR BATHROOM CABINET OR SIMILAR ARTICLE

Original Filed Jan. 19, 1946

INVENTORS
Walter Fanelli
Carl H. Laystrom

BY

The firm of Charles A. Hill

ATTORNEY.

Reissued Dec. 7, 1948

Des. Re. 23,055

UNITED STATES PATENT OFFICE 23,055

A FRONT FOR BATHROOM CABINET OR SIMILAR ARTICLE

Walter Fanelli, South Euclid, Ohio, and Carl A. Laystrom, Decatur, Ill., assignors to Faries Manufacturing Company, Decatur, Ill., a corporation of Illinois Original No. 147,785, dated November 4, 1947, Serial No. 125,737, January 19, 1946, for 14 years. Application for reissue June 22, 1948, Serial No. 147,134. Term of patent 14 years (Cl. D4—3)

*To all whom it may concern*:

Be it known that we, Walter Fanelli and Carl A. Laystrom, both citizens of the United States and residents of the city of South Euclid, in the county of Cuyahoga and State of Ohio, and of the city of Decatur, in the county of Macon and State of Illinois, respectively, have jointly invented a new, original, and ornamental Design for a Front for Bathroom Cabinet or Similar Article, of which the following is a specification, reference being had to the accompanying drawing, forming a part thereof.

Figure 2:
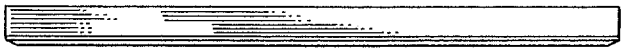
Figure 2 is a top plan view.
Figure 1:
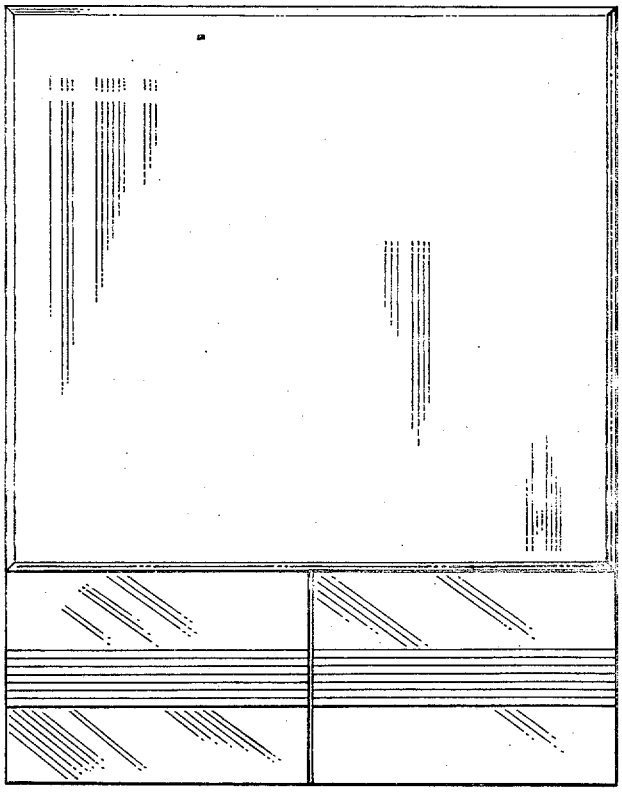
Figure 1 is a front elevational view of the front for bathroom cabinet or similar article, showing our new design.
Figure 3:
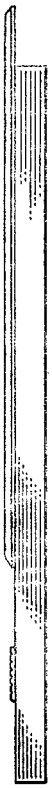
Figure 3 is a side elevational view thereof.

We claim:

The ornamental design for a front for bathroom cabinet or similar article, as shown.

WALTER FANELLI.
CARL A. LAYSTROM.

REFERENCES CITED

The following references are of record in the file of this patent:

UNITED STATES PATENTS

| Number | Name | Date |
|---|---|---|
| D. 96,560 | McNamara | Aug. 13, 1935 |
| D. 96,771 | McDonald | Sept. 3, 1935 |
| D. 102,414 | Connors | Dec. 22, 1936 |
| D. 132,737 | Marchand | June 9, 1942 |